United States Patent
Ando

(10) Patent No.: US 9,720,533 B2
(45) Date of Patent: Aug. 1, 2017

(54) TOUCH TYPE INPUT TERMINAL

(71) Applicant: MURATA MANUFACTURING CO., LTD., Nagaokakyo-Shi, Kyoto-fu (JP)

(72) Inventor: Masamichi Ando, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 127 days.

(21) Appl. No.: 14/453,745

(22) Filed: Aug. 7, 2014

(65) Prior Publication Data

US 2014/0347304 A1 Nov. 27, 2014

Related U.S. Application Data

(63) Continuation of application No. PCT/JP2013/053311, filed on Feb. 13, 2013.

(30) Foreign Application Priority Data

Feb. 15, 2012 (JP) .................................. 2012-030374

(51) Int. Cl.
*G06F 3/041* (2006.01)
*G06F 3/045* (2006.01)
(Continued)

(52) U.S. Cl.
CPC ............. *G06F 3/041* (2013.01); *G01B 7/003* (2013.01); *G01B 7/14* (2013.01); *G01L 1/16* (2013.01);
(Continued)

(58) Field of Classification Search
CPC .......... G06F 3/041; G06F 3/0416; G06F 3/03; G06F 3/044; G06F 2203/04102;
(Continued)

(56) References Cited

U.S. PATENT DOCUMENTS

2009/0085866 A1 4/2009 Sugahara
2009/0309616 A1 12/2009 Klinghult et al.
(Continued)

FOREIGN PATENT DOCUMENTS

CN 102165400 A 8/2011
EP 2 381 340 A2 10/2011
(Continued)

OTHER PUBLICATIONS

PCT/JP2013/053311 Written Opinion dated May 2, 2013.

*Primary Examiner* — Amit Chatly
(74) *Attorney, Agent, or Firm* — Arent Fox LLP

(57) ABSTRACT

A touch type input terminal that includes a base substrate, a piezoelectric sensor and an electrostatic sensor which are flat membrane-shaped, respectively. The electrostatic sensor includes a plurality of segment electrodes on a first main surface of a base film and a plurality of common electrodes on a second main surface. The piezoelectric sensor includes a piezoelectric film formed of PLLA drawn uniaxially. Displacement detecting electrodes are formed on a third main surface of the piezoelectric film so as to divide the third main surface into four portions. Displacement detecting electrodes are formed on a fourth main surface of the piezoelectric film so as to be opposed to the displacement detecting electrodes on the third main surface.

9 Claims, 6 Drawing Sheets

(51) Int. Cl.
*G06F 3/043* (2006.01)
*G01L 1/16* (2006.01)
*G01B 7/00* (2006.01)
*G01B 7/14* (2006.01)
*G06F 3/044* (2006.01)
*G06F 3/03* (2006.01)

(52) U.S. Cl.
CPC ............ *G06F 3/03* (2013.01); *G06F 3/044* (2013.01); *G06F 3/0416* (2013.01); *G06F 2203/04102* (2013.01); *G06F 2203/04106* (2013.01)

(58) Field of Classification Search
CPC . G06F 2203/04106; G01B 7/003; G01B 7/14; G01L 1/16
USPC .................................................. 345/156–179
See application file for complete search history.

(56) References Cited

U.S. PATENT DOCUMENTS

| | | | | |
|---|---|---|---|---|
| 2010/0289758 A1* | 11/2010 | Matsubara | ............ | G06F 3/044 345/173 |
| 2011/0261021 A1* | 10/2011 | Modarres | ................ | G06F 3/016 345/177 |
| 2012/0075226 A1 | 3/2012 | Andoh | | |
| 2013/0027339 A1* | 1/2013 | Kodani | .................... | G01L 1/16 345/173 |
| 2013/0057499 A1 | 3/2013 | Ando et al. | | |

FOREIGN PATENT DOCUMENTS

| | | | | |
|---|---|---|---|---|
| EP | 2 442 213 A1 | 4/2012 | | |
| JP | 04-273316 | 9/1992 | | |
| JP | 5-061592 A | 3/1993 | | |
| JP | 2004-046792 A | 2/2004 | | |
| JP | 2005-213376 A | 8/2005 | | |
| JP | 2009-086403 A | 4/2009 | | |
| JP | 2010-108490 A | 5/2010 | | |
| JP | WO 2011125389 A1 * | 10/2011 | ............... | G01L 1/16 |
| JP | 2011-253517 A | 12/2011 | | |
| JP | 2012-018590 | 1/2012 | | |
| WO | WO-2010-143528 A1 | 12/2010 | | |
| WO | WO 2010/143528 A1 | 12/2010 | | |

* cited by examiner

FIG. 4(A)
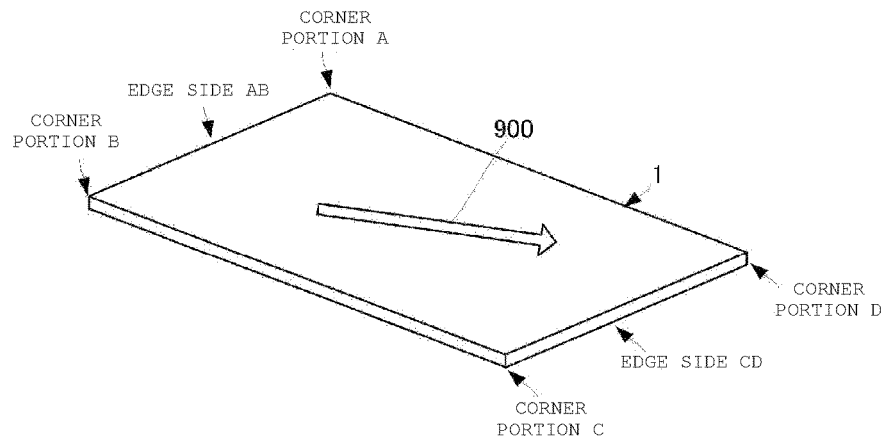
FIG. 4(B)
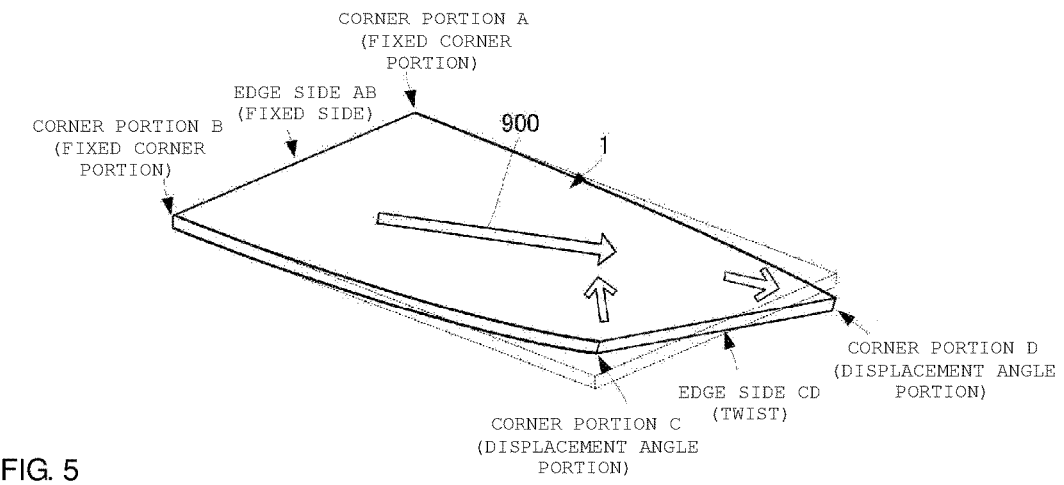
FIG. 5
| DISPLACEMENT STATE | V(ReA) | V(ReB) | V(ReC) | V(ReD) |
|---|---|---|---|---|
| BEND (+a) | +VBa | +VBa | +VBa | +VBa |
| BEND (+b) | +VBb | +VBb | +VBb | +VBb |
| BEND (−a) | −VBa | −VBa | −VBa | −VBa |
| TWIST (+c) | +VWc | −VWc | +VWc | −VWc |
| TWIST (+d) | +VWd | −VWd | +VWd | −VWd |
| TWIST (−c) | −VWc | +VWc | −VWc | +VWc |

| DISPLACEMENT STATE | V(ReA) | V(ReB) | V(ReC) | V(ReD) |
|---|---|---|---|---|
| BEND (+a) | +VBa | −VBa | +VBa | −VBa |
| BEND (+b) | +VBb | −VBb | +VBb | −VBb |
| BEND (−a) | −VBa | +VBa | −VBa | +VBa |
| TWIST (+c) | +VWc | +VWc | +VWc | +VWc |
| TWIST (+d) | +VWd | +VWd | +VWd | +VWd |
| TWIST (−c) | −VWc | −VWc | −VWc | −VWc |

TOUCH TYPE INPUT TERMINAL

CROSS REFERENCE TO RELATED APPLICATIONS

The present application is a continuation of International application No. PCT/JP2013/053311, filed Feb. 13, 2013, which claims priority to Japanese Patent Application No. 2012-030374, filed Feb. 15, 2012, the entire contents of each of which are incorporated herein by reference.

FIELD OF THE INVENTION

The present invention relates to a touch type input terminal for detecting a position in which an operation input is carried out with a finger or the like.

BACKGROUND OF THE INVENTION

Various touch type input terminals (devices) for detecting a touch position of an operation surface by an operator are conventionally devised. For example, the touch type input device disclosed in Patent Document 1 has a structure in which a plate-shaped electrostatic capacity detection type touch sensor and a plate-shaped pressure sensitive sensor are superimposed on each other. With the structure, the touch type input device disclosed in the Patent Document 1 detects a touch position and pressing force against the touch position.

Patent Document 1: Japanese Unexamined Patent Publication No. Hei 5-61592

SUMMARY OF THE INVENTION

In the conventional touch type input device such as the touch type input device described in the Patent Document 1, however, an operation input from an operator is accepted by only an operation input to an operation surface. For this reason, it is impossible to accept more various operation inputs.

Accordingly, it is an object of the present invention to provide a touch type input terminal capable of performing an input through a simple touch on an operation surface, and furthermore, carrying out more various operation inputs.

The touch type input terminal according to the present invention is characterized by having the following structure. The touch type input terminal includes a touch position detecting panel, a piezoelectric film and a displacement detecting electrode for detecting a displacement of bend or twist of the piezoelectric film. The touch position detecting panel includes a flat membrane-shaped main body having a first main surface and a second main surface opposed to the first main surface which serve as an operation surface side and includes an electrostatic capacity detecting electrode formed on the first main surface and the second main surface. The piezoelectric film is flat membrane-shaped with a third main surface and a fourth main surface which are opposed to each other. The displacement detecting electrode is formed on one of the third main surface and the fourth main surface of the piezoelectric film and detects a voltage generated by a displacement due to at least one of bend and twist of the piezoelectric film. In the touch type input terminal, the first main surface and the second main surface of the touch position detecting panel, and the third main surface and the fourth main surface of the piezoelectric film are arranged to almost overlap with each other as seen from the operation surface side.

With this structure, by utilizing the fact that voltages output from the respective displacement detecting electrodes are individuals depending on the displacement of the piezoelectric film, it is possible to detect the displacement of the piezoelectric film from a voltage distribution. For example, the voltage distribution differs in the case in which the piezoelectric film is bent in a predetermined direction and the case in which the piezoelectric film is twisted. By detecting the voltage distribution, accordingly, it is possible to detect that the piezoelectric film is bent or twisted, that is, displaced. Consequently, it is possible to implement a touch type input terminal capable of carrying out an operation input on an operation surface through the touch position detecting panel and an operation input through the displacement (bend, twist or the like) of the touch type input terminal, respectively. In this case, furthermore, the touch position detecting panel and the piezoelectric film are flat membrane-shaped, respectively. Therefore, it is possible to implement a thin touch type input terminal.

Referring to the touch type input terminal according to the present invention, moreover, it is preferable that the displacement detecting electrode should be divided into a plurality of portions in a first direction of the third main surface or the fourth main surface and should be divided into a plurality of portions in a second direction which is orthogonal to the first direction.

With this structure, a plurality of displacement detecting electrodes is formed in the first direction and a plurality of displacement detecting electrodes is formed in the second direction, that is, at least four displacement detecting electrodes are formed in different regions from each other with respect to the piezoelectric film. By this structure, individual voltage distributions are obtained through plural types of displacements (bend, twist and the like) having different displacement patterns, respectively. Accordingly, it is possible to individually detect plural types of displacements.

Referring to the touch type input terminal according to the present invention, furthermore, it is preferable that the piezoelectric film should be formed of polylactic acid drawn uniaxially in a parallel direction with the third main surface and the fourth main surface.

With this structure, it is possible to detect the displacement of the piezoelectric film with higher sensitivity.

Referring to the touch type input terminal according to the present invention, moreover, it is preferable that a direction of the uniaxial drawing of the piezoelectric film should be parallel with the first direction.

Referring to the touch type input terminal according to the present invention, furthermore, a direction of the uniaxial drawing of the piezoelectric film may form a predetermined angle with respect to the first direction and the second direction.

With these structures, a specific use mode of the piezoelectric film using the polylactic acid is shown. By appropriately setting the uniaxial drawing direction, thus, it is possible to properly set the sensitivity of the piezoelectric film to a displacement to be detected.

Referring to the touch type input terminal according to the present invention, moreover, it is preferable that the main body of the touch position detecting panel should be formed by the piezoelectric film and the electrostatic capacity detecting electrode and the displacement detecting electrode should be formed compositely on the same surface.

With this structure, the main body of the touch position detecting panel is the piezoelectric film, and the electrostatic capacity detecting electrode and the displacement detecting electrode are formed on one of the surfaces of the piezoelectric film. Therefore, it is possible to implement a thinner touch type input terminal.

According to the present invention, it is possible to implement a touch type input terminal capable of carrying out various operation inputs.

BRIEF EXPLANATION OF THE DRAWINGS

FIGS. 4(A) and 4(B) are conceptual views showing the case in which the touch type input terminal 1 is twisted.

FIG. 5 is a table showing an example of a voltage distribution in a state in which the touch type input terminal 1 according to the first embodiment of the present invention is bent and a state in which the touch type input terminal 1 is twisted.

DETAILED DESCRIPTION OF THE INVENTION

Figure 1A:
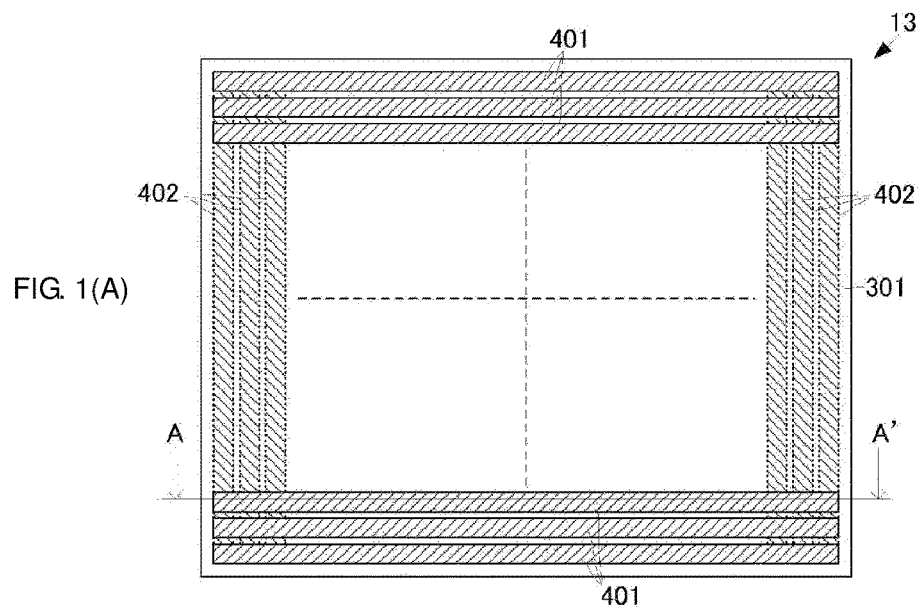
FIGS. 1(A) TO 1(C) are views for explaining a structure of a touch panel 10 in a touch type input terminal 1 according to a first embodiment of the present invention.
Figure 1B:
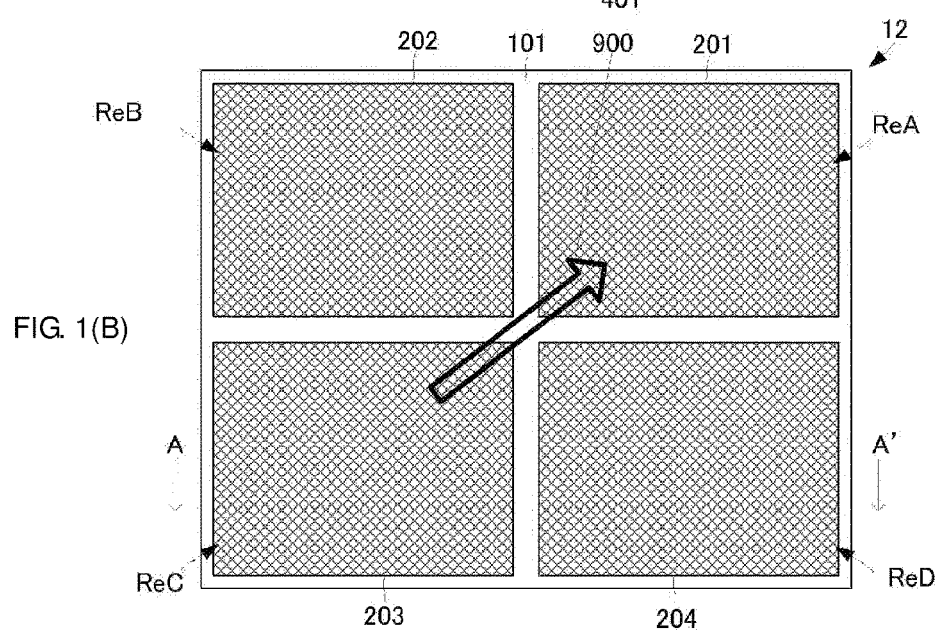
Figure 1C:
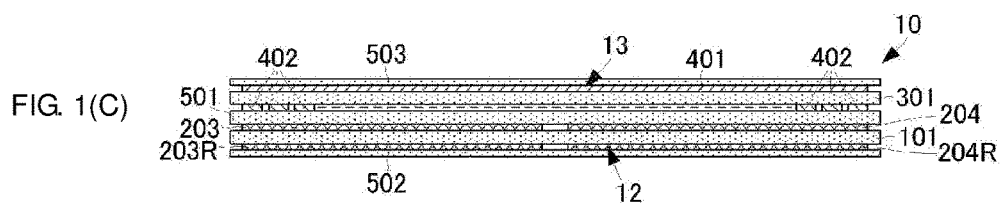
Figure 2:
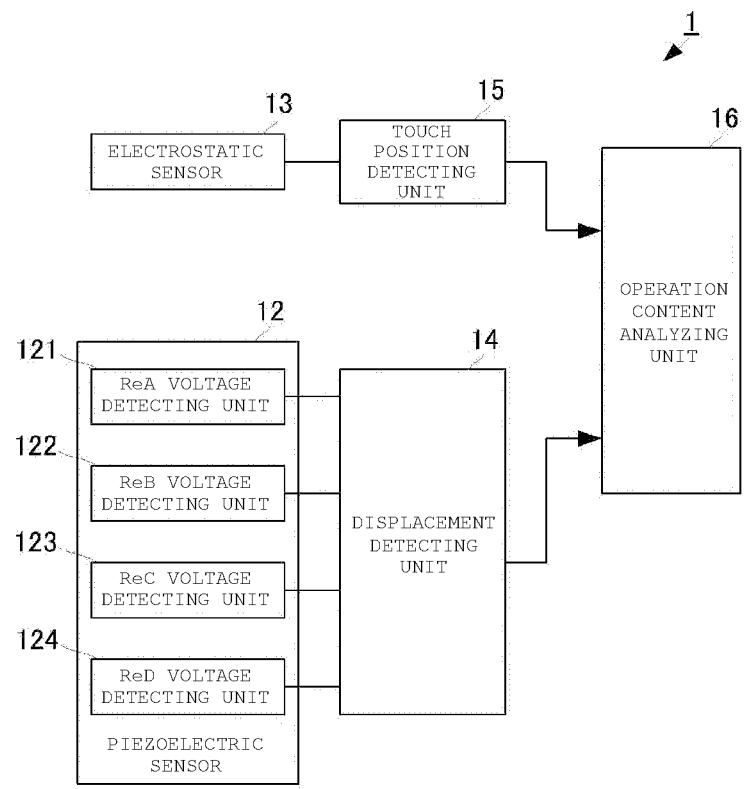
FIG. 2 is a functional block diagram showing the touch type input terminal 1 according to the first embodiment of the present invention.

A touch type input terminal according to a first embodiment of the present invention will be described with reference to the drawings. FIGS. 1(A) to 1(C) are views for explaining a structure of a touch panel 10 in a touch type input terminal 1 according to the first embodiment of the present invention. FIG. 1(A) is a plan view showing a structure of an electrostatic sensor 13 of the touch type input terminal 1. FIG. 1(B) is a plan view showing a structure of a piezoelectric sensor 12 of the touch type input terminal 1. FIG. 1(C) is a sectional side view showing the touch type input terminal 1. FIG. 1(C) is a view showing an A-A' section illustrated in FIGS. 1(A) and 1(B). FIG. 2 is a functional block diagram showing the touch type input terminal 1 according to the first embodiment of the present invention.

The touch type input terminal 1 includes a piezoelectric sensor 12, an electrostatic sensor 13 corresponding to a "touch position detecting panel" according to the present invention, a displacement detecting unit 14, a touch position detecting unit 15, and an operation content analyzing unit 16. The piezoelectric sensor 12 and the electrostatic sensor 13 are combined to form a touch panel 10, and the touch panel 10 has the structure shown in FIGS. 1(A) to 1(C).

The piezoelectric sensor 12 includes a piezoelectric film 101, displacement detecting electrodes 201, 202, 203, 204, 201R, 202R, 203R and 204R.

The piezoelectric film 101 is formed by a rectangular flat membrane having third and fourth main surfaces opposed to each other. A long length direction is set to be a first direction and a short length direction is set to be a second direction. The piezoelectric film 101 is formed by L-type polylactic acid (PLLA) drawn uniaxially. In the present embodiment, the piezoelectric film 101 is uniaxially drawn almost along a diagonal line of a rectangle (see an outlined arrow of a two-dot chain line in FIG. 1(B)). This direction will be hereinafter referred to as a uniaxial drawing direction 900. In the case in which the piezoelectric film 101 is a square, it is preferable that the uniaxial drawing direction 900 should be set along the diagonal line. In the case in which the piezoelectric film 101 is a rectangle, moreover, it is preferable that the uniaxial drawing direction 900 should form an angle of 45° with respect to the first direction or the second direction. However, the angle is not restricted thereto but a design is preferably performed to set an optimum angle in consideration of a characteristic of the piezoelectric film 101 or a usage state of the device. Consequently, the uniaxial drawing direction 900 is set to form a predetermined angle with respect to the first direction and the second direction of the piezoelectric film 101.

The PLLA is a chiral polymer and a main chain has a spiral structure. The PLLA has piezoelectricity when it is uniaxially drawn so that a molecule is oriented. A piezoelectric constant of the PLLA drawn uniaxially belongs to very high classes in polymers.

It is suitable that the draw ratio should be approximately threefold to eightfold. By carrying out heat treatment after drawing, crystallization of an extended-chain crystal of polylactic acid is promoted so that the piezoelectric constant can be enhanced. In the case in which biaxial drawing is carried out, it is possible to obtain the same advantages as those of the uniaxial drawing by causing draw ratios of respective axes to be different from each other. For example, in the case in which eightfold drawing is carried out in a certain direction as an X axis and double drawing is carried out in a Y-axis direction which is orthogonal to the same axis, it is possible to obtain equivalent advantages to those in the case in which fourfold uniaxial drawing is performed in an approximately X-axis direction with respect to the piezoelectric constant. A film drawn simply and uniaxially is apt to be torn in a drawing axial direction. For this reason, it is possible to increase strength to some degree by performing the biaxial drawing.

Moreover, the PLLA generates piezoelectricity by a molecule orientation processing through drawing or the like and does not need to be subjected to polling differently from another polymer such as PVDF or piezoelectric ceramics. In other words, the piezoelectricity of the PLLA which does not belong to ferroelectrics is not expressed by ion polarization differently from ferroelectrics such as PVDF or PZT but is derived from a spiral structure to be a characteristic structure of a molecule. For this reason, pyroelectricity caused by other ferroelectric piezoelectrics is not generated in the PLLA. In addition, a piezoelectric constant of the PVDF or the like is changed with passage of time. In some cases, the piezoelectric constant is remarkably reduced. However, the piezoelectric constant of the PLLA is very stabilized with the passage of time.

Moreover, the PLLA has a great piezoelectric output constant (=piezoelectric g constant, $g=d/\in^T$). By using the PLLA, accordingly, it is possible to detect a displacement with very high sensitivity.

The displacement detecting electrodes 201, 202, 203 and 204 are formed on the third main surface to be one of the main surfaces of the piezoelectric film 101 formed by the PLLA having the property. The displacement detecting electrodes 201, 202, 203 and 204 are formed in such a shape as to divide the third main surface of the piezoelectric film 101 into four parts substantially equally. More specifically, the displacement detecting electrode 201 and the displacement detecting electrode 202 are formed side by side in the first direction of the piezoelectric film 101. The displacement detecting electrode 203 and the displacement detecting electrode 204 are formed side by side in the first direction of the piezoelectric film 101. Moreover, the displacement detecting electrode 201 and the displacement detecting electrode 203 are formed side by side in the second direction of the piezoelectric film 101. The displacement detecting electrode 202 and the displacement detecting electrode 204 are formed side by side in the second direction of the piezoelectric film 101.

By this structure, the displacement detecting electrode 201 and the displacement detecting electrode 203 are arranged on one of diagonal lines of the piezoelectric film 101. Moreover, the displacement detecting electrode 202 and the displacement detecting electrode 204 are arranged on the other diagonal line of the piezoelectric film 101. The displacement detecting electrodes 201 to 204 are arranged rotation-symmetrically by 180° with respect to a center of an operation surface seen on a plane.

The displacement detecting electrodes 201R, 202R, 203R and 204R are formed on the fourth main surface to be the other main surface of the piezoelectric film 101. The displacement detecting electrode 201R has a substantially equal area to that of the displacement detecting electrode 201 and is formed in such a position that an almost whole surface is opposed to the displacement detecting electrode 201. The displacement detecting electrode 202R has a substantially equal area to that of the displacement detecting electrode 202 and is formed in such a position that an almost whole surface is opposed to the displacement detecting electrode 202. The displacement detecting electrode 203R has a substantially equal area to that of the displacement detecting electrode 203 and is formed in such a position that an almost whole surface is opposed to the displacement detecting electrode 203. The displacement detecting electrode 204R has a substantially equal area to that of the displacement detecting electrode 204 and is formed in such a position that an almost whole surface is opposed to the displacement detecting electrode 204.

For these displacement detecting electrodes 201 to 204 and 201R to 204R, it is suitable to use any of an organic electrode containing ITO, ZnO and polythiophene as main components, an organic electrode containing polyaniline as a main component, a silver nanowire electrode and a carbon nanotube electrode. By using these materials, it is possible to form an electrode pattern having high translucency. If transparency is not required, it is also possible to use an electrode formed by silver paste or a metal based electrode formed by vapor deposition, sputtering, plating or the like. Since the touch panel 10 is greatly displaced, it is particularly suitable to use an organic electrode containing, as a main component, polythiophene having excellent bendability, an organic electrode containing polyaniline as a main component, a silver nanowire electrode, a carbon nanotube electrode or a metal based electrode.

A region interposed between the displacement detecting electrodes 201 and 201R in the piezoelectric film 101 acts as a detection region ReA and functions as an ReA voltage detecting unit 121. A region interposed between the displacement detecting electrodes 202 and 202R in the piezoelectric film 101 acts as a detection region ReB and functions as an ReB voltage detecting unit 122. A region interposed between the displacement detecting electrodes 203 and 203R in the piezoelectric film 101 acts as a detection region ReC and functions as an ReC voltage detecting unit 123. A region interposed between the displacement detecting electrodes 204 and 204R in the piezoelectric film 101 acts as a detection region ReD and functions as an ReD voltage detecting unit 124.

The piezoelectric sensor 12 having the structure is pasted onto a plate-shaped base substrate 501. In this case, the piezoelectric sensor 12 is pasted onto the base substrate 501 in such a manner that the third main surface and the fourth main surface of the piezoelectric film 101 in the piezoelectric sensor 12 are parallel with a main surface of the base substrate 501.

The base substrate 501 is formed by polymer having comparatively high strength, for example, polyethylene terephthalate (PET), polyethylene naphthalate (PEN), polycarebonate (PC), acrylic resin (PMMA) or the like. A thickness of the base substrate 501 is properly set depending on the strength required for the base substrate 501.

The electrostatic sensor 13 includes a base film 301, a plurality of segment electrodes 401 and a plurality of common electrodes 402. The base film 301 is formed by a rectangular flat membrane having a first main surface and a second main surface which are opposed to each other. The base film 301 is formed by a material having a predetermined dielectric constant and has such strength that a displacement (bend, twist or the like) of the base substrate 501 is prevented from being hindered as greatly as possible. It is suitable that the base film 301 should be formed by a material having translucency.

The segment electrodes 401 are formed in an array at a predetermined interval over the first main surface to be one of the main surfaces of the base film 301. The respective segment electrodes 401 are long and are arranged in an orthogonal direction to a longitudinal direction.

The common electrodes 402 are formed in an array at a predetermined interval over the second main surface to be the other main surface of the base film 301. The respective common electrodes 402 are long and are arranged in an orthogonal direction to a longitudinal direction. The segment electrodes 401 and the common electrodes 402 are formed in such a manner that the longitudinal direction of the common electrodes 402 and that of the segment electrodes 401 are almost orthogonal to each other as seen in an orthogonal direction to the first main surface and the second main surface.

The segment electrode 401 and the common electrode 402 are preferably formed by the same materials as those of the displacement detecting electrodes 201 to 204 and 201R to 204R.

With this structure, by detecting a change in an electrostatic capacity between the segment electrode and the common electrode depending on a touched position, it is possible to configure an electrostatic capacity type touch position detecting panel for detecting a touch position.

The electrostatic sensor 13 having this structure is pasted onto an opposed surface to the surface of the base substrate 501 where the piezoelectric sensor 12 is pasted.

A protective film 503 is provided on a surface at an opposite side to the base substrate 501 of the electrostatic sensor 13. The protective film 503 is formed by a material having flexibility and insulation properties. The protective film 503 is formed by a material having translucency. For example, PET or PP is preferably used for the protective film 503.

A protective film 502 is provided on a surface at an opposite side to the base substrate 501 of the piezoelectric sensor 12. The protective film 502 is formed by a material having insulation properties. The protective film 502 is formed by a material having translucency. For example, PET or PP is preferably used for the protective film 502.

By the structure described above, the touch panel 10 including the piezoelectric sensor 12 and the electrostatic sensor 13 can be configured to be plate-shaped, that is, thin. Moreover, all of the base substrate 501, the piezoelectric sensor 12, the electrostatic sensor 13 and the protective films 502 and 503 are formed by materials having the translucency. Consequently, it is possible to configure the touch type input terminal 1 having the translucency. By configuring the touch type input terminal 1 having the translucency, thus, it is possible to see a liquid crystal display when the liquid crystal display or the like is disposed on a back side of the touch type input terminal 1. Moreover, it is also possible to dispose a photocell or the like on the back side of the touch type input terminal 1. By disposing the photocell, thus, it is possible to charge electricity generated by the photocell to a secondary battery provided separately, thereby utilizing the secondary battery as a power supply for the touch type input terminal 1.

The piezoelectric sensor 12 and the electrostatic sensor 13 in the touch panel 10 having the structure are connected to respective circuits in a subsequent stage as shown in FIG. 2.

As shown in FIG. 2, a detection voltage V(ReA) output from the ReA voltage detecting unit 121, that is, a voltage generated between the displacement detecting electrodes 201 and 201R by the displacement of the piezoelectric film 101 is output to the displacement detecting unit 14. A detection voltage V(ReB) output from the ReB voltage detecting unit 122, that is, a voltage generated between the displacement detecting electrodes 202 and 202R by the displacement of the piezoelectric film 101 is output to the displacement detecting unit 14. A detection voltage V(ReC) output from the ReC voltage detecting unit 123, that is, a voltage generated between the displacement detecting electrodes 203 and 203R by the displacement of the piezoelectric film 101 is output to the displacement detecting unit 14. A detection voltage V(ReD) output from the ReD voltage detecting unit 124, that is, a voltage generated between the displacement detecting electrodes 204 and 204R by the displacement of the piezoelectric film 101 is output to the displacement detecting unit 14.

Details will be described below. The detection voltages V(ReA), V(ReB), V(ReC) and V(ReD) have a voltage distribution depending on the displacement state of the piezoelectric film 101. Accordingly, the displacement detecting unit 14 detects the displacement state from the voltage distribution of the detection voltages V(ReA), V(ReB), V(ReC) and V(ReD). The displacement detecting unit 14 outputs a result of the detection of the displacement state to the operation content analyzing unit 16.

Each of the segment electrodes 401 and each of the common electrodes 402 in the electrostatic sensor 13 are connected to the touch position detecting unit 15. A touch position detection voltage detected by the electrostatic sensor 13 is output to the touch position detecting unit 15. The touch position detecting unit 15 detects a touch position on the operation surface based on a combination of the segment electrode 401 and the common electrode 402 from which the touch position detection voltage is detected. The touch position detecting unit 15 outputs a touch position detection result to the operation content analyzing unit 16.

The operation content analyzing unit 16 analyzes an operation content by using at least one of the displacement state detection result and the touch position detection result.

In the case in which the operation is analyzed based on the touch position, for example, the operation content analyzing unit 16 acquires a control command based on a touched position from the touch position detection result and executes the control command.

For the control command, the following various commands can be executed in the case in which the touch type input terminal 1 is utilized for a remote control of a TV.

A command for performing switching into a channel corresponding to a touch position;

A command for adjusting a volume depending on a track of the touch position; and A command for analyzing a channel number depending on the track of the touch position and performing switching into the analyzed channel.

In the case in which the operation content is analyzed based on the displacement state, for example, the operation content analyzing unit 16 specifies the control command based on the displacement state detection result and executes the control command.

For the control command, the following various commands can be executed in the case in which the touch type input terminal 1 is utilized for a remote control of a TV.

A command for adjusting a volume depending on a bending quantity and a bending direction in the case in which the bend of the touch type input terminal 1 is detected; and A command for switching a channel depending on a twisting quantity and a twisting direction in the case in which the twist of the touch type input terminal 1 is detected.

As described above, by using the structure according to the present embodiment, it is possible to carry out control command execution processing by performing a displacement (bend, twist or the like) of the touch type input terminal 1 as well as a touch operation on the operation surface. Consequently, it is possible to implement a touch type input terminal capable of carrying out various operation inputs.

Figure 3A:
FIGS. 3(A) and 3(B) are conceptual views showing the case in which the touch type input terminal 1 is bent.
Figure 3B:

Next, a detection concept of the bend or twist according to the present embodiment will be described in more detail. FIGS. 3(A) and 3(B) are conceptual views showing the case in which the touch type input terminal 1 is bent, and FIG. 3(A) is a side view showing a state brought before the bend and FIG. 3(B) is a side view showing a bending state. FIGS. 3(A) and 3(B) show the case in which the touch type input terminal 1 is bent in a longitudinal direction. In FIGS. 3(A) and 3(B), moreover, an upper side of FIGS. 3(A) and 3(B) correspond to the operation surface side of the touch type input terminal 1. FIGS. 4(A) and 4(B) are conceptual views showing the case in which the touch type input terminal 1 is twisted, FIG. 4(A) is a perspective view showing a state brought before the twist and FIG. 4(B) is a perspective view showing a twisting state. For easy understanding of the drawings and principle, FIGS. 3(A), 3(B), 4(A) and 4(B) show the structure of the touch type input terminal 1 which is simplified. FIGS. 4(A) and 4(B) show the case in which an edge side AB to be one end in the longitudinal direction of the touch type input terminal 1 (the base substrate 501) is set to be a fixed edge side and twist occurs on an edge side CD to be the other end. In other words, FIGS. 4(A) and 4(B) show the case in which corner portions A and B to be both ends of the fixed edge side AB are fixed corner portions and corner portions C and D to be both sides of the edge side CD are displaced in an almost orthogonal direction to the operation surface of the touch type input terminal 1 and in reverse directions to each other. FIG. 5 is a table showing an example of a voltage distribution in a state in which the touch type input terminal 1 according to the first embodiment of the present invention is bent and a state in which the touch type input terminal 1 is twisted.

(Bending Displacement Detection)

As shown in FIG. 3(A), in the case in which a bending displacement is zero, that is, external force for generating the bend is not applied to the touch type input terminal 1, the base substrate 501 of the touch type input terminal 1 is brought into a state in which the main surface is flat as shown in FIG. 3(A). In this case, the piezoelectric film 101 of the piezoelectric sensor 12 neither extends nor contracts and an output voltage from the piezoelectric sensor 12 is not changed by the bending displacement. For example, if the detection voltage is set to be 0[V] in this state, all of the detection voltage V(ReA) output from the ReA voltage detecting unit 121, the detection voltage V(ReB) output from the ReB voltage detecting unit 122, the detection voltage V(ReC) output from the ReC voltage detecting unit 123 and the detection voltage V(ReD) output from the ReD voltage detecting unit 124 are 0[V].

In the case in which the bending displacement has a predetermined value, that is, the external force for generating the bend is applied to the touch type input terminal 1, the base substrate 501 of the touch type input terminal 1 has the main surface curved in the longitudinal direction as shown in FIG. 3(B). In this case, the piezoelectric film 101 of the piezoelectric sensor 12 extends or contracts depending on a surface where the piezoelectric sensor 12 is pasted onto the base substrate 501 and a bending direction. Consequently, the output voltage from the piezoelectric sensor 12 is changed by the bending displacement.

By using the structure according to the present embodiment, the respective detection voltages V(ReA), V(ReB), V(ReC) and V(ReD) are changed in the following manner.

If the bending displacement is +a, the detection voltages V(ReA), V(ReB), V(ReC) and V(ReD) have substantially equal voltage values +VBa as shown in FIG. 5 based on a relationship between the uniaxial drawing direction 900 and the bending direction (the longitudinal direction of the touch type input terminal 1).

If the bending displacement is +b (≠+a), the detection voltages V(ReA), V(ReB), V(ReC) and V(ReD) have substantially equal voltage values +VBb (≠+VBa) as shown FIG. 5.

If the bending displacement is −a, that is, the bending displacement has an equal bending quantity in a reverse direction to +a, the detection voltages V(ReA), V(ReB), V(ReC) and V(ReD) have substantially equal voltage values −VBa as shown in FIG. 5.

With the structure according to the present embodiment, thus, all of the detection voltages V(ReA), V(ReB), V(ReC) and V(ReD) have substantially equal voltage values depending on bending quantities with respect to the bending displacement.

Accordingly, the voltage values of the detection voltages V(ReA), V(ReB), V(ReC) and V(ReD) are compared with each other. If these are substantially equal to each other, it is possible to detect that the touch type input terminal 1 is bent. By measuring the voltage value in this case, moreover, it is possible to detect a bending direction and a bending quantity.

(Twisting Displacement Detection)

As shown in FIG. 4(A), in the case in which a twisting displacement is zero, that is, external force for generating the twist is not applied to the touch type input terminal 1, the base substrate 501 of the touch type input terminal 1 is brought into a state in which the main surface is flat as shown in FIG. 4(A). In this case, the piezoelectric film 101 of the piezoelectric sensor 12 neither extends nor contracts and an output voltage from the piezoelectric sensor 12 is not changed by the twisting displacement. For example, if the detection voltage is set to be 0[V] in this state, all of the detection voltage V(ReA) output from the ReA voltage detecting unit 121, the detection voltage V(ReB) output from the ReB voltage detecting unit 122, the detection voltage V(ReC) output from the ReC voltage detecting unit 123 and the detection voltage V(ReD) output from the ReD voltage detecting unit 124 are 0[V].

In the case in which the twisting displacement has a predetermined value, that is, the external force for generating the twist is applied to the touch type input terminal 1, the base substrate 501 of the touch type input terminal 1 is brought into a state in which the displaced corner portion C and the displaced corner portion D are separated from each other in an orthogonal direction to the main surface before the displacement and in different directions from each other with respect to the main surface as shown in FIG. 4(B). In this case, the piezoelectric film 101 of the piezoelectric sensor 12 partially extends or contracts depending on a surface where the piezoelectric sensor 12 is pasted onto the base substrate 501 and a twisting direction. Consequently, the output voltage from the piezoelectric sensor 12 through the twisting displacement is changed. More specifically, the detection voltages V(ReA), V(ReB), V(ReC) and V(ReD) are changed individually through the twisting state.

In the case in which the twisting displacement is +c (the corner portion C is displaced to an upper side of the main surface (the operation surface) and the corner portion D is displaced to a lower side of the main surface (the operation surface) as shown in FIG. 4(B), absolute values of the detection voltages V(ReA), V(ReB), V(ReC) and V(ReD) are substantially equal voltage values VWc based on a relationship between the uniaxial drawing direction 900 and the twisting direction as shown in FIG. 5. The detection voltages V(ReA) and V(ReC) have different signs from those of the detection voltages V(ReB) and V(ReD). For example, the detection voltages V(ReA) and V(ReC) have voltage values +VWc and the detection voltages V(ReB) and V(ReD) have voltage values −VWc.

In the case in which the twisting displacement is +d (≠+c), the absolute values of the detection voltages V(ReA), V(ReB), V(ReC) and V(ReD) are substantially equal voltage values VWd as shown in FIG. 5. The detection voltages V(ReA) and V(ReC) have different signs from those of the detection voltages V(ReB) and V(ReD). For example, the detection voltages V(ReA) and V(ReC) have voltage values +VWd and the detection voltages V(ReB) and V(ReD) have voltage values −VWd.

In the case in which the twisting displacement is −c, that is, the twisting displacement has an equal twisting quantity in a reverse direction to +c, the absolute values of the detection voltages V(ReA), V(ReB), V(ReC) and V(ReD) are substantially equal voltage values VWc as shown in FIG. 5. The detection voltages V(ReA) and V(ReC) have different signs from those of the detection voltages V(ReB) and V(ReD). In this case, the sign of the detection voltage is reverse to that in the case in which the twisting displacement is +c. Specifically, in the case in which the detection voltages V(ReA) and V(ReC) have the voltage values +VWc and the detection voltages V(ReB) and V(ReD) have the voltage values −VWc with the twisting displacement of +c, the detection voltages V(ReA) and V(ReC) have the voltage values −VWc and the detection voltages V(ReB) and V(ReD) have the voltage values +VWc with the twisting displacement of −c.

With the structure according to the present embodiment, thus, the detection voltages V(ReA) and V(ReC) through the displacement detecting electrode disposed in the uniaxial drawing direction and the detection voltages V(ReB) and V(ReD) through the displacement detecting electrode disposed in an orthogonal direction to the uniaxial drawing direction have substantially equal absolute voltage values depending on the twisting quantity and different signs with respect to the twisting displacement.

By observing the voltage distribution of the detection voltages V(ReA), V(ReB), V(ReC) and V(ReD), accordingly, it is possible to detect that the touch type input terminal 1 is twisted. By measuring the voltage value in this case, moreover, it is possible to detect a twisting direction and a twisting quantity.

Figure 6:
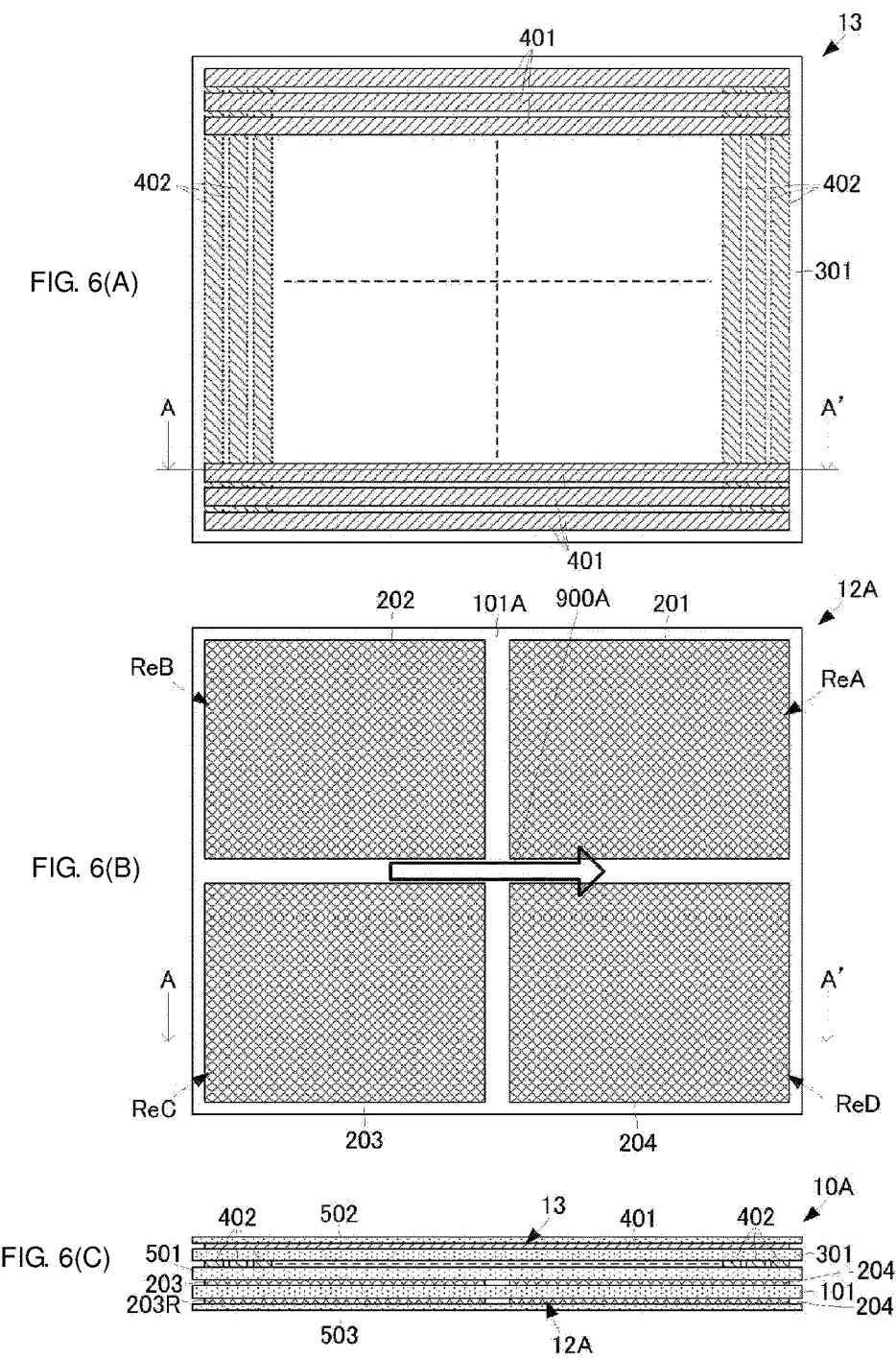
FIGS. 6(A) to 6(C) are views for explaining a structure of a touch panel 10A in a touch type input terminal 1A according to a second embodiment of the present invention.

Next, a structure of a touch type input terminal according to a second embodiment will be described with reference to the drawings. FIGS. 6(A) to 6(C) are views for explaining a structure of a touch panel 10A in a touch type input terminal 1A according to the second embodiment of the present invention. FIG. 6(A) is a plan view showing a structure of an electrostatic sensor 13 in the touch type input terminal 1A. FIG. 6(B) is a plan view showing a structure of a piezoelectric sensor 12 of the touch type input terminal 1A. FIG. 6(C) is a sectional side view showing the touch type input terminal 1A. FIG. 6(C) is a view showing an A-A' section illustrated in FIGS. 6(A) and 6(B). The touch type input terminal 1A according to the present embodiment has a uniaxial drawing direction of a piezoelectric film 101A, the uniaxial drawing direction being different from the touch type input terminal 1 according to the first embodiment, and the structure and the other structures excluding detection processing are the same as those of the touch type input terminal 1 according to the first embodiment. Accordingly, only different portions will be described below.

In the touch type input terminal 1A according to the present embodiment, a uniaxial drawing direction 900A is parallel with a longitudinal direction of the touch type input terminal 1A, that is, a longitudinal direction of the piezoelectric film 101A. By this structure, displacement detecting electrodes 201 and 202 are arranged in the uniaxial drawing direction 900A and displacement detecting electrodes 203 and 204 are arranged in the uniaxial drawing direction 900A. Moreover, the displacement detecting electrodes 201 and 204 are arranged in an orthogonal direction to the uniaxial drawing direction 900A and the displacement detecting electrodes 202 and 203 are arranged in the orthogonal direction to the uniaxial drawing direction 900A. In the same manner as in the first embodiment, the displacement detecting electrodes 201 to 204 are disposed rotation-symmetrically by 180° with respect to a center of an operation surface as seen on a plane.

Figures 7, 8:
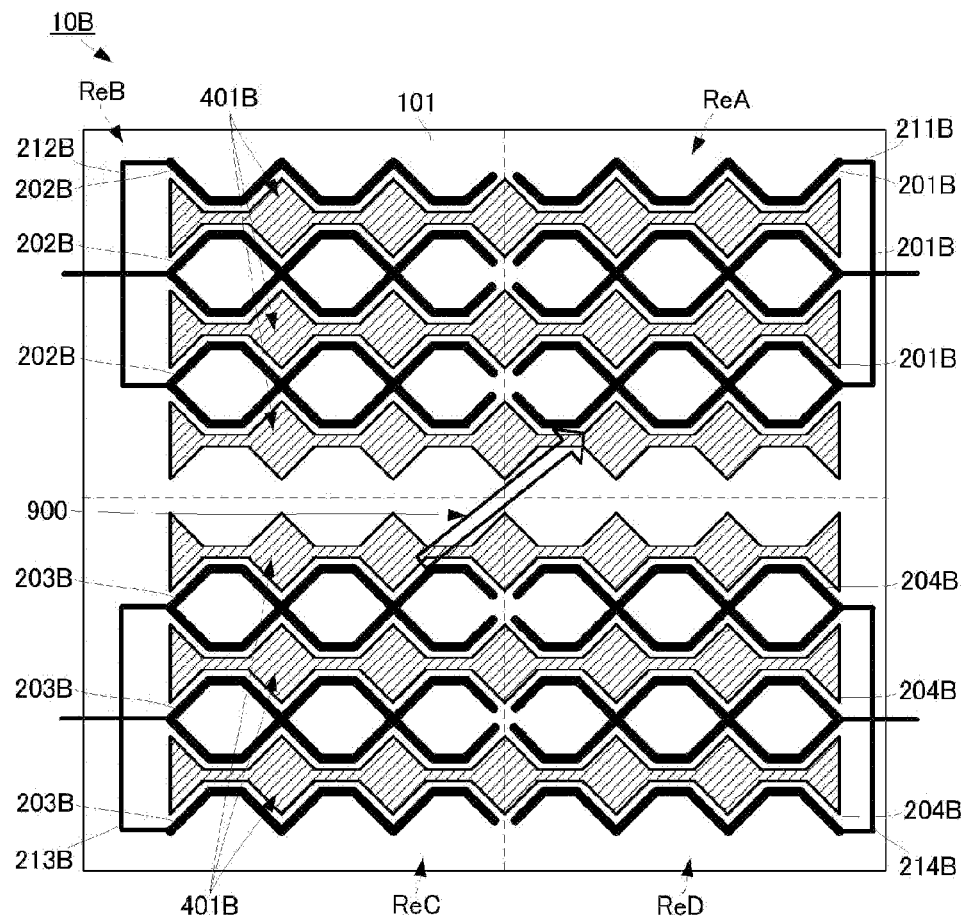
FIG. 7 is a table showing an example of a voltage distribution in a state in which the touch type input terminal 1A according to the second embodiment of the present invention is bent and a state in which the touch type input terminal 1A is twisted.
FIG. 8 is a plan view showing a structure of a touch panel 10B in a touch type input terminal 1B according to a third embodiment of the present invention.

With this structure, bend or twist can be detected as follows. FIG. 7 is a table showing an example of a voltage distribution in a state in which the touch type input terminal 1A according to the second embodiment of the present invention is bent and a state in which the touch type input terminal 1A is twisted.

(Bending Displacement Detection)

In the case in which a bending displacement is zero, that is, external force for generating the bend is not applied to the touch type input terminal 1A, the base substrate 501 of the touch type input terminal 1A is brought into a state in which the main surface is flat. In this case, the piezoelectric film 101A of the piezoelectric sensor 12A neither extends nor contracts and an output voltage from the piezoelectric sensor 12A is not changed by the bending displacement. For example, if the detection voltage is set to be 0[V] in this state, all of the detection voltage V(ReA) output from the ReA voltage detecting unit 121, the detection voltage V(ReB) output from the ReB voltage detecting unit 122, the detection voltage V(ReC) output from the ReC voltage detecting unit 123 and the detection voltage V(ReD) output from the ReD voltage detecting unit 124 are 0[V].

In the case in which the bending displacement has a predetermined value, that is, the external force for generating the bend is applied to the touch type input terminal 1A, the base substrate 501 of the touch type input terminal 1A has the main surface curved in the longitudinal direction. In this case, the piezoelectric film 101A of the piezoelectric sensor 12A extends or contracts depending on a surface where the piezoelectric sensor 12A is pasted onto the base substrate 501 and a bending direction. Consequently, the output voltage from the piezoelectric sensor 12A is changed by the bending displacement.

By using the structure according to the present embodiment, the respective detection voltages V(ReA), V(ReB), V(ReC) and V(ReD) are changed in the following manner.

In the case in which the bending displacement is +a, absolute values of the detection voltages V(ReA), V(ReB), V(ReC) and V(ReD) are substantially equal voltage values VBa based on a relationship between the uniaxial drawing direction 900A and the bending direction (the longitudinal direction of the touch type input terminal 1A) as shown in FIG. 7. The detection voltages V(ReA) and V(ReC) and the detection voltages V(ReB) and V(ReD) have different signs from each other. For example, the detection voltages V(ReA) and V(ReC) are voltage values +VBa and the detection voltages V(ReB) and V(ReD) have voltage values −VBa.

In the case in which the bending displacement is +b (≠+a), the absolute values of the detection voltages V(ReA), V(ReB), V(ReC) and V(ReD) are substantially equal voltage values VBb as shown in FIG. 7. The detection voltages V(ReA) and V(ReC) and the detection voltages V(ReB) and V(ReD) have different signs from each other. For example, the detection voltages V(ReA) and V(ReC) have voltage values +VBb and the detection voltages V(ReB) and V(ReD) have voltage values −VBb.

In the case in which the bending displacement is −a, that is, the bending displacement has an equal bending quantity in a reverse direction to +a, the absolute values of the detection voltages V(ReA), V(ReB), V(ReC) and V(ReD) are substantially equal voltage values VBa as shown in FIG. 7. The detection voltages V(ReA) and V(ReC) have different signs from those of the detection voltages V(ReB) and V(ReD). In this case, the sign of the detection voltage is reverse to that in the case in which the bending displacement is +a. Specifically, in the case in which the detection voltages V(ReA) and V(ReC) have the voltage values +VBa and the detection voltages V(ReB) and V(ReD) have the voltage values −VBa with the bending displacement of +a, the detection voltages V(ReA) and V(ReC) have the voltage values −VBa and the detection voltages V(ReB) and V(ReD) have the voltage values +VBa with the bending displacement of −a.

With the structure according to the present embodiment, thus, the detection voltages V(ReA) and V(ReB) through the displacement detecting electrode disposed in the uniaxial drawing direction and the detection voltages V(ReC) and V(ReD) through the displacement detecting electrode disposed in an orthogonal direction to the uniaxial drawing direction have substantially equal absolute voltage values depending on the bending quantity and different signs with respect to the bending displacement.

By observing the voltage distribution of the detection voltages V(ReA), V(ReB), V(ReC) and V(ReD), accordingly, it is possible to detect that the touch type input terminal 1 is bent. By measuring the voltage value in this case, moreover, it is possible to detect a bending direction and a bending quantity.

(Twisting Displacement Detection)

In the case in which a twisting displacement is zero, that is, external force for generating the twist is not applied to the touch type input terminal 1, the base substrate 501 of the touch type input terminal 1A is brought into a state in which the main surface is flat. In this case, the piezoelectric film 101A of the piezoelectric sensor 12A neither extends nor contracts and an output voltage from the piezoelectric sensor 12 is not changed by the twisting displacement. For example, if the detection voltage is set to be 0[V] in this state, all of the detection voltage V(ReA) output from the ReA voltage detecting unit 121, the detection voltage V(ReB) output from the ReB voltage detecting unit 122, the detection voltage V(ReC) output from the ReC voltage detecting unit 123 and the detection voltage V(ReD) output from the ReD voltage detecting unit 124 are 0[V].

In the case in which the twisting displacement has a predetermined value, that is, external force for generating the twist is applied to the touch type input terminal 1, the base substrate 501 of the touch type input terminal 1A is brought into a state in which a pair of corner portions in a short length direction are separated from each other in an orthogonal direction to the main surface before the displacement and in different directions from each other with respect to the main surface. In this case, the piezoelectric film 101A of the piezoelectric sensor 12A partially extends or contracts depending on a surface where the piezoelectric sensor 12A is pasted onto the base substrate 501 and a twisting direction.

With use of the structure according to the present embodiment, the respective detection voltages V(ReA), V(ReB), V(ReC) and V(ReD) are changed as follows with respect to the twist.

In the case in which the twisting displacement is +c, the detection voltages V(ReA), V(ReB), V(ReC) and V(ReD) have substantially equal voltage values +VWc based on a relationship between the uniaxial drawing direction 900A and the twisting direction as shown in FIG. 7.

In the case in which the twisting displacement is +d (≠+c), the detection voltages V(ReA), V(ReB), V(ReC) and V(ReD) have substantially equal voltage values +VWd (≠+VWc) as shown in FIG. 7.

In the case in which the twisting displacement is −c, that is, the twisting displacement has an equal twisting quantity in a reverse direction to +c, the detection voltages V(ReA), V(ReB), V(ReC) and V(ReD) have substantially equal voltage values −VWc as shown in FIG. 7.

With the structure according to the present embodiment, thus, all of the detection voltages V(ReA), V(ReB), V(ReC) and V(ReD) have substantially equal voltage values depending on twisting quantities with respect to the twisting displacement.

Accordingly, the voltage values of the detection voltages V(ReA), V(ReB), V(ReC) and V(ReD) are compared with each other. If these are substantially equal to each other, it is possible to detect that the touch type input terminal 1A is twisted. By measuring the voltage value in this case, moreover, it is possible to detect a twisting direction and a twisting quantity.

Figure 9:
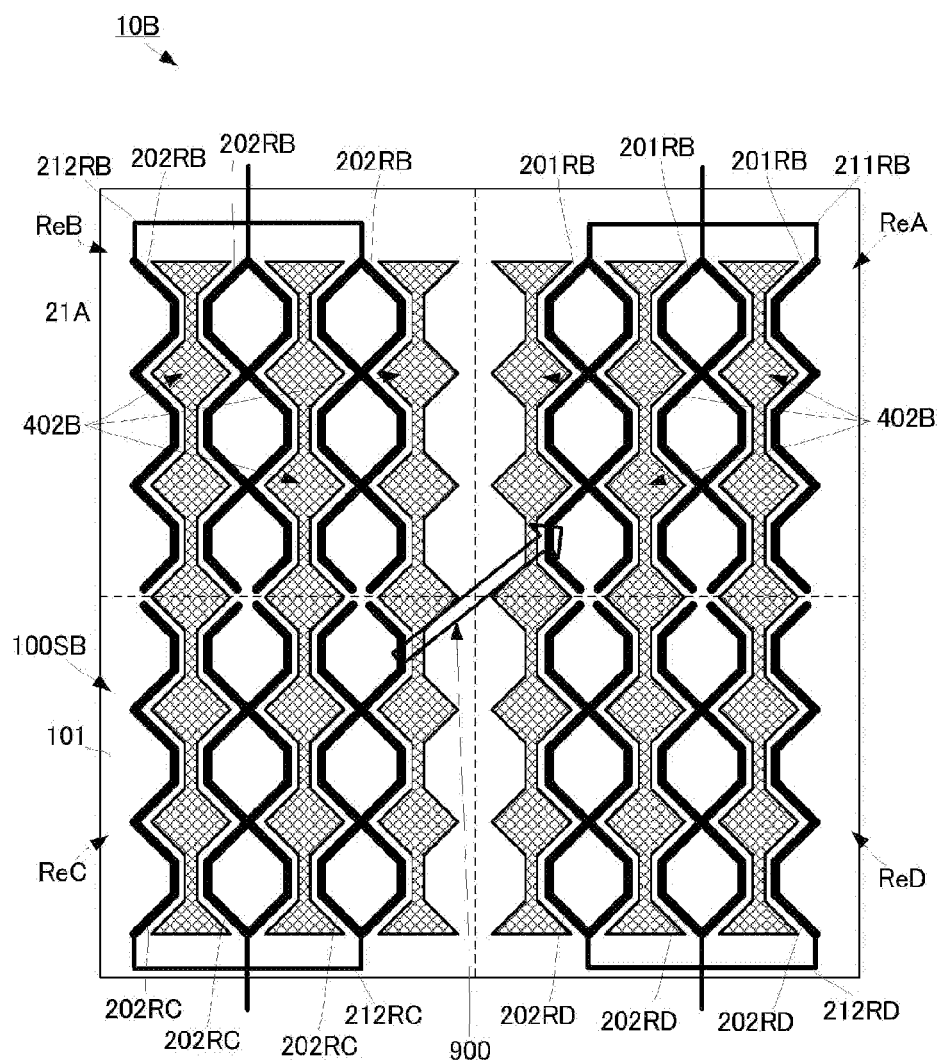
FIG. 9 is a rear view showing the structure of the touch panel 10B in the touch type input terminal 1B according to the third embodiment of the present invention.

Next, a touch type input terminal according to a third embodiment will be described with reference to the drawings. FIG. 8 is a plan view showing a structure of a touch panel 10B of a touch type input terminal 1B according to the third embodiment of the present invention. FIG. 9 is a rear view showing the structure of the touch panel 10B of the touch type input terminal 1B according to the third embodiment of the present invention. In the touch panel 10B according to the present embodiment, schematically, a piezoelectric film 101 is also used as a base film of an electrostatic sensor.

A plurality of segment electrodes 401B schematically taking a long shape is formed in an array on a third main surface of the piezoelectric film 101. The segment electrodes 401B are formed in an array in an orthogonal direction to a longitudinal direction. The segment electrode 401B is formed in such a shape that a wide portion and a narrow portion are alternately coupled to each other in the longitudinal direction.

Displacement detecting electrodes 201B, 202B, 203B and 204B are formed on the third main surface to be one of main surfaces of the piezoelectric film 101. The displacement detecting electrode 201B is formed in a detection region ReA obtained by division through a dummy dividing line which passes through a center of the third main surface seen on a plane and is orthogonal to each side. The displacement detecting electrode 201B is a wire electrode and is separated from an external shape of the segment electrode 401B at a predetermined interval and is formed in a shape conforming to the external shape within a range of the detection region ReA. The displacement detecting electrode 201B is connected through a layout electrode 211B.

The displacement detecting electrode 202B is formed in a detection region ReB obtained by the division through the dummy dividing line which passes through the center of the third main surface seen on a plane and is orthogonal to each side. The displacement detecting electrode 202B is a wire electrode and is separated from the external shape of the segment electrode 401B at a predetermined interval and is formed in a shape conforming to the external shape within a range of the detection region ReB. The displacement detecting electrode 202B is connected through a layout electrode 212B.

The displacement detecting electrode 203B is formed in a detection region ReC obtained by the division through the dummy dividing line which passes through the center of the third main surface seen on a plane and is orthogonal to each side. The displacement detecting electrode 203B is a wire electrode and is separated from the external shape of the segment electrode 401B at a predetermined interval and is formed in a shape conforming to the external shape within a range of the detection region ReC. The displacement detecting electrode 203B is connected through a layout electrode 213B.

The displacement detecting electrode 204B is formed in a detection region ReD obtained by the division through the dummy dividing line which passes through the center of the third main surface seen on a plane and is orthogonal to each side. The displacement detecting electrode 204B is a wire electrode and is separated from the external shape of the segment electrode 401B at a predetermined interval and is formed in a shape conforming to the external shape within a range of the detection region ReD. The displacement detecting electrode 204B is connected through a layout electrode 214B.

A plurality of common electrodes 402B schematically taking a long shape is formed in an array on a fourth main surface to be the other surface of the piezoelectric film 101. The common electrodes 402B are formed in an array in an orthogonal direction to a longitudinal direction. The common electrode 402B is formed in such a shape that a wide portion and a narrow portion are alternately coupled to each other in the longitudinal direction. The longitudinal direction of the common electrode 402B and that of the segment electrode 401B are orthogonal to each other as seen in a direction in which the piezoelectric film 101 is seen on a plane.

Displacement detecting electrodes 201RB, 202RB, 203RB and 204RB are formed on the fourth main surface of the piezoelectric film 101. The displacement detecting electrode 201RB is formed in the detection region ReA obtained by division through a dummy dividing line which passes through a center of the fourth main surface seen on a plane and is orthogonal to each side. The displacement detecting electrode 201RB is a wire electrode and is separated from an external shape of the common electrode 402B at a predetermined interval and is formed in a shape conforming to the external shape within the range of the detection region ReA. The displacement detecting electrode 201RB is formed in partial overlap with the displacement detecting electrode 201B as seen in the direction in which the piezoelectric film 101 is seen on a plane. The displacement detecting electrode 201RB is connected through a layout electrode 211RB.

The displacement detecting electrode 202RB is formed in the detection region ReB obtained by the division through the dummy dividing line which passes through the center of the fourth main surface seen on a plane and is orthogonal to each side. The displacement detecting electrode 202B is a wire electrode and is separated from the external shape of the common electrode 402B at a predetermined interval and is formed in the shape conforming to the external shape within the range of the detection region ReB. The displacement detecting electrode 202RB is formed in partial overlap with the displacement detecting electrode 202B as seen in the direction in which the piezoelectric film 101 is seen on a plane. The displacement detecting electrode 202RB is connected through a layout electrode 212RB.

The displacement detecting electrode 203RB is formed in the detection region ReC obtained by the division through the dummy dividing line which passes through the center of the fourth main surface seen on a plane and is orthogonal to each side. The displacement detecting electrode 203RB is a wire electrode and is separated from the external shape of the common electrode 402B at a predetermined interval and is formed in the shape conforming to the external shape within the range of the detection region ReC. The displacement detecting electrode 203RB is formed in partial overlap with the displacement detecting electrode 203B as seen in the direction in which the piezoelectric film 101 is seen on a plane. The displacement detecting electrode 203RB is connected through a layout electrode 213RB.

The displacement detecting electrode 204RB is formed in the detection region ReD obtained by the division through the dummy dividing line which passes through the center of the fourth main surface seen on a plane and is orthogonal to each side. The displacement detecting electrode 204RB is a wire electrode and is separated from the external shape of the common electrode 402B at a predetermined interval and is formed in the shape conforming to the external shape within the range of the detection region ReD. The displacement detecting electrode 204RB is formed in partial overlap with the displacement detecting electrode 204B as seen in the direction in which the piezoelectric film 101 is seen on a plane. The displacement detecting electrode 204RB is connected through a layout electrode 214RB.

With this structure, in the same manner as in each of the embodiments, it is possible to carry out an operation input through a touch position and an operation input through the displacement of a touch type input terminal. By using the structure according to the present embodiment, it is possible to form an electrostatic sensor and a piezoelectric sensor by a single piezoelectric film. Therefore, it is not necessary to individually form the piezoelectric sensor and the electrostatic sensor. Accordingly, it is possible to form the touch type input terminal more thinly. In the case in which the touch type input terminal is formed transparently, moreover, electrode layers in a layer direction are decreased so that a degree of transparency is increased.

Each of the electrode patterns according to the embodiments is only illustrative. If an operation surface is divided into a plurality of regions to form an electrode pattern in such a manner that a voltage through a displacement can be detected every divided region, it is possible to obtain the functions and effects.

Although the example using the PLLA for the piezoelectric film has been described in the embodiments, moreover, it is also possible to use PDLA, poly-γ-methyl glutamate, poly-γ-benzil glutamate, cellulose, collagen, poly-D-propylene oxide, PVDF, PVDF-TrFE copolymer, polyuria or the like.

Furthermore, the description has been given to the example in which the displacement detecting region is set into four regions in the embodiments. If a predetermined positional relationship is established for the uniaxial drawing direction, however, the number of the regions to be set is not restricted thereto but is preferably two or more.

DESCRIPTION OF REFERENCE SYMBOLS 1, 1A touch type input terminal
10 touch panel
12, 12A piezoelectric sensor
13 electrostatic sensor
14 displacement detecting unit
15 touch position detecting unit
16 operation content analyzing unit
101, 101A piezoelectric film
121 ReA voltage detecting unit
122 ReB voltage detecting unit
123 ReC voltage detecting unit
124 ReD voltage detecting unit
201, 202, 203, 204, 201R, 202R, 203R, 204R, 201B, 202B, 203B, 204B, 201RB, 202RB, 203RB, 204RB displacement detecting electrode
211B, 212B, 213B, 214B, 211RB, 212RB, 213RB, 214RB layout electrode
301 base film
401, 401B segment electrode
402, 402B common electrode
501 base substrate
502, 503 protective film
900, 900A uniaxial drawing direction

The invention claimed is:

1. A touch type input terminal comprising:
a touch position detecting panel including:
a flat main body having a first main surface and a second main surface opposed to the first main surface; and
electrostatic capacity detecting electrodes on the first main surface and the second main surface;
a single, unitary, flat piezoelectric film having a third main surface and a fourth main surface which are opposed to each other;
a first displacement detecting electrode on the third main surface, the first displacement detecting electrode including a first plurality of divided portions; and
a second displacement detecting electrode on the fourth main surface, the second displacement detecting electrode including a second plurality of divided portions, wherein each of the first plurality of divided portions are opposed to at least one of the second plurality of divided portions, and each of the first and second plurality of divided portions detecting a respective voltage generated by a displacement due to at least one of a bend and a twist of the piezoelectric film, the respective voltages indicating a voltage distribution of a bending quantity and bending direction or a twisting quantity and twisting direction,
wherein the first main surface and the second main surface, and the third main surface and the fourth main surface are arranged to overlap with each other.

2. The touch type input terminal according to claim 1, wherein the first plurality of divided portions extend in a first direction and the second plurality of divided portions extend in a second direction which is orthogonal to the first direction.

3. The touch type input terminal according to claim 2, wherein the piezoelectric film is polylactic acid that was drawn uniaxially in a parallel direction with the third main surface and the fourth main surface.

4. The touch type input terminal according to claim 3, wherein a direction of the uniaxial drawing of the piezoelectric film is parallel with the first direction.

5. The touch type input terminal according to claim 3, wherein a direction of the uniaxial drawing of the piezoelectric film is along a predetermined angle with respect to the first direction and the second direction.

6. The touch type input terminal according to claim 1, wherein the first plurality of divided portions and the second plurality of divided portions are each divided into four parts.

7. The touch type input terminal according to claim 6, wherein each of the four parts of the first plurality of divided portions are aligned opposed to a respective one of the four parts of the second plurality of divided portions.

8. The touch type input terminal according to claim 1, further comprising a base substrate between the touch position detecting panel and the piezoelectric film.

9. The touch type input terminal according to claim 1, wherein the voltage distribution is different between the bend and the twist of the piezoelectric film.

* * * * *